United States Patent [19]

Boullt et al.

[11] Patent Number: 5,605,004
[45] Date of Patent: Feb. 25, 1997

[54] SPINNER FISHING LURE

[76] Inventors: John H. Boullt, 10249 Cardinal St., Fountain Valley, Calif. 92708; Robert E. Coulter, 9592 Juanita St., Cypress, Calif. 90630

[21] Appl. No.: 554,187
[22] Filed: Nov. 6, 1995
[51] Int. Cl.6 .................................................. A01K 85/10
[52] U.S. Cl. ........................................ 43/42.13; 43/44.83
[58] Field of Search ............................... 43/42.11, 42.13, 43/42.15, 44.83

[56] References Cited

U.S. PATENT DOCUMENTS

| | | | |
|---|---|---|---|
| 1,713,041 | 5/1929 | Fey | 43/44.83 X |
| 1,867,555 | 7/1932 | Hildebrandt | 43/42.11 X |
| 4,133,135 | 1/1979 | Miles | 43/42.13 |
| 4,571,877 | 2/1986 | Montgomery | 43/42.11 |
| 4,625,448 | 12/1986 | Borders | 43/42.11 |
| 4,640,041 | 2/1987 | Stanley | 43/42.13 |
| 4,718,191 | 1/1988 | Gentry | 43/42.13 |
| 4,765,085 | 8/1988 | Wotawa et al. | 43/42.11 |
| 4,793,089 | 12/1988 | Long et al. | 43/42.13 |
| 4,815,233 | 3/1989 | Pingel | 43/42.11 |
| 4,823,500 | 4/1989 | Shindeldecker | 43/42.13 |
| 4,901,470 | 2/1990 | Gentry | 43/42.13 |
| 5,136,801 | 8/1992 | Pond | 43/42.13 X |
| 5,146,706 | 9/1992 | Hilliard | 43/42.13 |
| 5,226,268 | 7/1993 | Sisson, Jr. | 43/42.13 |
| 5,400,542 | 3/1995 | Johnson | 43/42.13 X |
| 5,412,899 | 5/1995 | Reboul | 43/42.13 |
| 5,481,821 | 1/1996 | Stanley | 43/42.13 |

*Primary Examiner*—Joseph J. Hail, III
*Assistant Examiner*—Jay A. Stelacone
*Attorney, Agent, or Firm*—Gordon K. Anderson

[57] ABSTRACT

A fishing lure comprises a wire shaft (20) angularly bent to form a first arm (24) and a second arm (26), with an arched open loop (30) at the apex of the bend. The first arm has a hollow tube (28) surrounding the wire shaft to increase the stiffness of the arm while permitting the second arm to move freely. The first arm is attached to a fishing hook (42) while a weighted head (44) with a filament skirt (56) covers the junction. The second arm contains a contiguous loop (32) at the distal end through which a spinner (58) is rotatably attached. A second or third spinner is attached to the arm with a yoke (64) when desired. A second embodiment of the contiguous loop utilizes a quick release closure (34) having a sleeve (36) that slideably engages both the wire shaft of the second arm and the contiguous loop distal end simultaneously. This sleeve is either a hollow cylinder (40) or tension spring (38) and may be slid away from the loop permitting separation of the loop from the arm to attach or change the spinner.

17 Claims, 3 Drawing Sheets

SPINNER FISHING LURE

TECHNICAL FIELD

The present invention relates to artificial fishing lures or bait in general. More specifically to a fishing lure that utilizes spinners associated with a head and hook disposed at opposite ends of a wire shaft.

BACKGROUND ART

Previously, many types of artificial lures have been used in endeavoring to provide an effective means for producing bait that will consistently attract fish. Prior art is replete with lures that utilize one or more spinners that rotate to attract game fish. The structure generally includes a V-shaped wireform arm or shaft with the spinner, or multiple thereof, on one end and a weighted hook on the other end. In many cases, the hook is attached adjacent to or integrally formed with a molded body of metal or some other heavy material. The hook is usually turned upwardly toward the wireform arm and a fishing line is secured at the apex of the V-shaped member. Sometimes the body is covered with a plastic or rubber skirt which extends rearwardly over the hook to partially obscure its identity and add a ripple effect, as the lure is retrieved through the water. These skirts are popular and have been included in most fishing lures in this discipline for sometime. The skirts are often a single color, but may be formed of mixed strands or filaments of varied hues.

Spinners have been known and widely used for decades and are mounted on a shaft that permits complete rotation when drawn through the water. The contour, or outline, of the spinner blade has been developed over the years to a fine art, as it determines not only its rotational speed, but also the angle of descent relative to its rotational axis. For example, a so-called Colorado blade rotates rather slowly and at an extreme angle with respect to its rotational axis, while the narrow so-called willow leaf blade rotates rapidly with a small angle with respect to its rotational axis. Many other shapes and configurations fall inbetween and rotate at various angles and speeds.

Some prior art utilizes noise producing spinners, known in the trade as "buzz bait", having multi-blade spinners that are rotatably mounted over the wire shaft and are shaped to create a cavitation emitting a sonic pulse. The multiple blades have a certain angular relationship that may be changed to regulate the noise produced by the spinners making the chattering noise of a number of vibrant pings rather than dead sounding clunks. Still others have multiple blades striking each other, as they simultaneously rotate.

It may be seen that a great deal of effort has been directed in this field of endeavor for many years, however, there is still room for improvement in spinner bait, due to its almost universal use and continued popularity.

A search of the prior art did not disclose any patents that read directly on the claims of the instant invention, however, the following U.S. patents are considered related:

U.S. Pat. No. 5,266,268, issued to Sisson, Jr., teaches a lure with a bifurcated frame with a hook on one arm and a spinner on the other. A dive plate, in fan shape, is located near the apex of the frame and is juxtapositioned therebetween. The dive plate creates a bottom hugging lure, as when it is pulled through the water it steers the lure in a downward direction.

Hilliard in U.S. Pat. No. 5,146,706 discloses a lure having a polymetric hub that mounts a number of fish hooks in opposed directions. The hook portions are aligned with opposed shanks and, by application of pressure to the shank, each hook is rotated to an open position.

Shindeldecker U.S. Pat. No. 4,823,500 utilizes a spherical member attached to one leg of a V-shaped shaft and a weighted hook fastened on the other. When the lure is retrieved through the water, the spherical member imparts a side to side motion to the lure.

U.S. Pat. No. 4,793,089 issued to Long et al uses a pair of nested noise producing spinners on one arm of a V-shaped structure. The spinners are rotatably mounted behind a spacer bead and the blade configuration cause the pair to rotate in the same direction at different speeds, striking each other to produce a fish attracting sound.

Wotawa et al, in U.S. Pat. 4,765,085, presents a lure with a vane for oscillating movement without rotating. A spinner on the trailing end of the vane spins freely for attracting fish.

Gentry U.S. Pat. No. 4,718,191 discloses a two-sided angular frame with one or more buzz blades or spinner blades mounted on one of the arms. The arm member is free to move or pivot back and forth at the point of attachment, however, it will not strike the other parts of the lure. The blades move vigorously from side to side imitating live bait.

Stanley U.S. Pat. No. 4,640,041, is similar in many respects to the instant invention, however, the wire body that is formed in the shape of a "V" and joined to a fishing line at the apex has one arm tapered to enhance the ability of the spinners attached thereon to spin, flash, and vibrate at a greater degree. The blade arm has a diameter preferably 62 to 70% of that of the hook arm, making it suitable for most fresh water fishing. The arm may be tapered by drawing, grinding, or a smaller diameter wire may be welded to the larger hook arm.

Borders U.S. Pat. No. 4,625,448 utilizes a bushing in an essentially V-shape shaft where it attaches to the line at the apex. The line is secured around the bushing rather than directly around the shaft of the lure, so as to minimize frictional wear on the line when the lure twists relative to the line.

Miles U.S. Pat. No. 4,133,135, discloses a lure having two wires supporting two spinner blades in alignment with a hook. In one embodiment, the second spinner wire is attached to the hook and parallels the second wire and is connected thereunto by various well known methods. The second embodiment has the second spinner wire protruding separately from the hook at the bulbous portion encapsulating the hook eye.

It may be seen that the majority of this prior art employs a hook and a generally configured V-shaped shaft with spinners of some type on one of the arms. Apparently the distinction found in this art varies only slightly, making minor improvements functionally different and, therefore, patentably distinguishable.

DISCLOSURE OF THE INVENTION

Sport and professional fishermen are always seeking to improve artificial lures in order to achieve a competitive edge. Spinners have been popular as bait, as they create the illusion of an edible small fish when they rotate and vibrate, generating a flash of reflected light while producing the dynamics of motion. As previously mentioned, considerable development has been achieved on these spinners, including optimum shape, size, texture, finish, contour, material, color, etc. Further, the shaft holding one or more of the spinners, along with the hook, usually covered with a weighted head, is almost universally utilized in various configurations. While the basic function of spacing the spinner from the hook and providing a convenient mounting platform for the spinner is achieved, there is still a problem of sizing the wire to accomplish both purposes simultaneously. If the shaft, or wire, is too stiff or rigid, the desired movement created by the spinner is lost completely. If the wire is too flexible, it will bend on the hook when the fish is caught and the vibrations are canceled by harmonics transmitted to both arms of the shaft.

It is, therefore, a primary object of the invention to utilize a single diameter wire of a size to optimize the spinner movement and then enclose it on one arm with a hollow tube effectively creating a device that now has the best of both worlds, as the stiffness is exactly optimum for the hook arm and the resiliency on the opposite arm permits the spinner to take on an entirely different movement characteristic that actually throbs and wiggles the bait in an entirely new, different, and unique manner. Tapered shafts, as utilized in prior art, do not function as a continuous diameter wire and the hook arm also acts different in its dampening characteristics than that of a solid wire and certainly far removed from two wires of different diameters welded together. Further, different characteristics or torque are achieved when a solid wire is embedded into a hollow sleeve particularly when epoxy is added to fill the gap therebetween.

An important object of the invention is the strength of the wire and tube combination, as each has a slightly different modules of elasticity with one yielding prior to the other permitting stretching of the combination before actually parting of the parent structure. This is an advantage when retrieving fish, as the tension is not constant, but instead intermittent with sudden bursts of energy from the fish. Further, the amount of bending of each arm may be easily controlled by simply altering the wall thickness of the tube and selecting the proper diameter for the spinner arm.

Another object of the invention is the initial cost of the material for the shaft, as both the wire and hollow tube are in production and easily obtained. Obviously, the wire is common and the hollow tube is manufactured for medical and commercial hypodermic needles, which are widely used in relatively large quantities. When taken in comparison with tapered wire, the initial cost is very competitive.

Still another object of the invention is the ease of manufacture. The shaft is made of two pieces, one end with the tube epoxied in place, therefore, the shaft may be easily bent into shape the same as with a common wire using the same tooling. It should be noted that no weld bulge is present to interfere with the bend at the apex, as suggested in some prior art.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
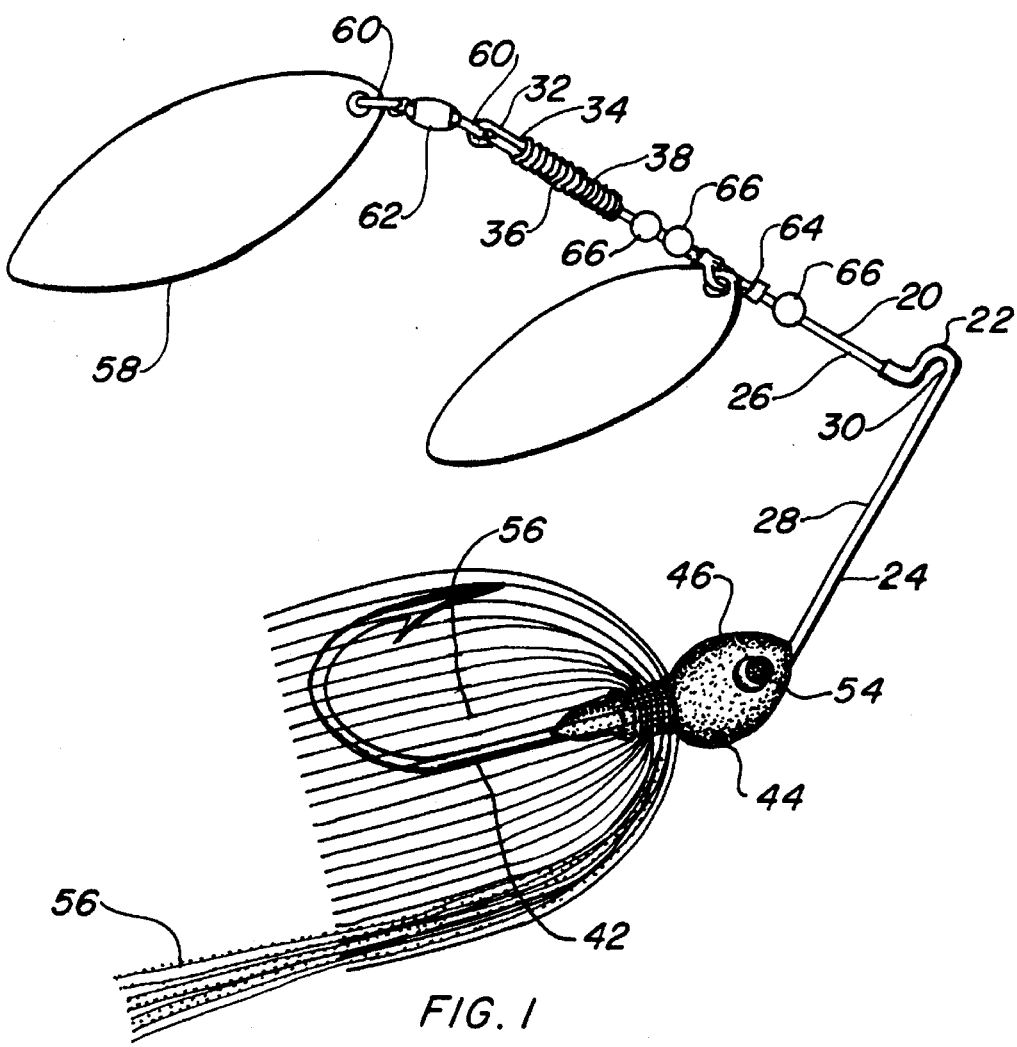
FIG. 1 is a elevation view of the preferred embodiment.
Figure 2:
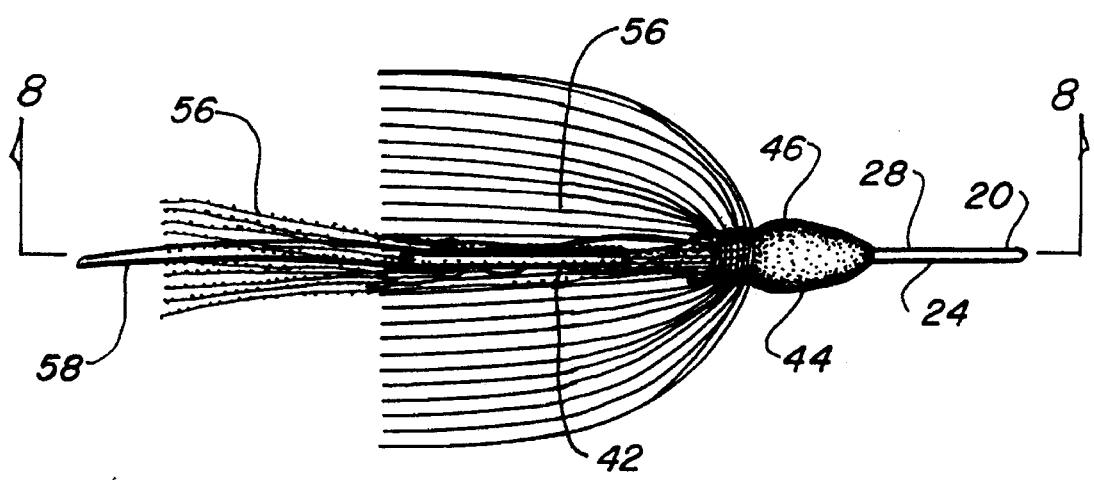
FIG. 2 is a bottom view of the preferred embodiment.
Figure 3:
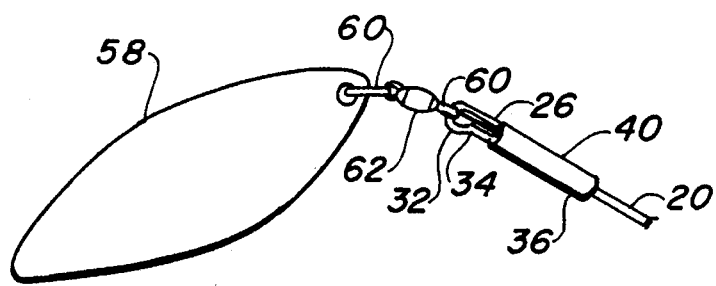
FIG. 3 is a fragmentary elevation view of the quick release closure locked in place.
Figure 4:
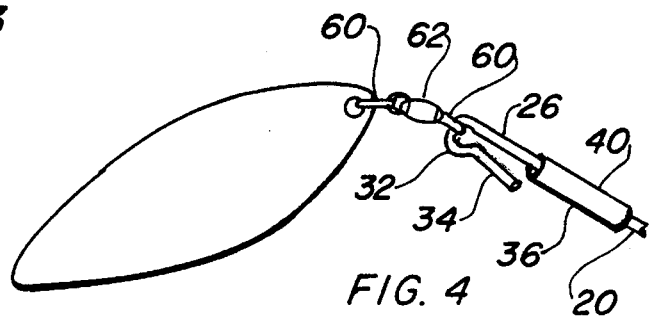
FIG. 4 is a fragmentary elevation view of the quick release closure opened in place.
Figure 5:
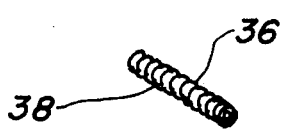
FIG. 5 is a partial isometric view of the quick release closure sleeve in the tension spring embodiment completely removed from the invention for clarity.
Figure 6:
FIG. 6 is a partial isometric view of the quick release closure sleeve in the hollow tube embodiment completely removed from the invention for clarity.

The best mode for carrying out the invention is presented in terms of a preferred embodiment with an alternate embodiment for a quick release closure on one end of a shaft.

The preferred embodiment, as shown in FIGS. 1 through 8, is comprised of a wire shaft 20 angularly bent into a substantially V-shape at an apex 22 forming a first arm 24 and a second arm 26. The wire shaft 20 is made of a round metallic wire preferably of stainless steel, sometimes referred to as spring wire. The diameter of the wire may vary as to the type of fish the lure is used for, basically ranging from an outside diameter of from 0.026 inches (0.066 cm) to 0.051 inches (0.13 cm), however, any other diameter would be acceptable in extreme cases. The favored configuration of the V-shaped bend between the arms 24 and 26 is from 80 degrees to 85 degrees in order to place the arms in the optimum relationship.

The prime novelty of the invention resides in the addition of a hollow tube 28 positioned over and intimately surrounding the shaft first arm 24. This tube 28 reinforces the arm 24, increasing the stiffness and changing the structural integrity entirely, thus augmenting the first arms 24 rigidity and, yet, leaving the unsheathed second arm 26 sufficiently flexible to move freely when acted upon by secondary forces. The overall clearance between the outside diameter of the arm 24 and the inside diameter of the tube 28 is preferably from 0.001 inches (0.0025 cm) to 0.004 inches (0.010 cm). This means that the actual distance between the arm and tube is one half of this value on each side when it is centered. It has been found that this specific clearance has proven optimum, as it is sufficient to thread the arm 24 through the tube 28 without binding and, yet, is close enough to reinforce the arm properly.

The hollow tube 28 is also constructed of stainless steel, such as 300 series, with A1S1 304 or 316 being preferred. Any tubing may be acceptable, however, it has been found that surgical tubing, such as used for hypodermic needles, is readily available and perfectly acceptable. The space between the arm 24 and tube 28 may be left vacant, or an epoxy resin may be added to this gap to eliminate the torsional twist of the arm within the tube. In the manufacturing process the arm 24 is dipped in, mixed and, yet uncured epoxy, and then threaded into the tube 28 where secondary bending may then take place prior to hardening of the epoxy resin. It will be noted that the clearance, wall thickness, material, and epoxy, all have an effect on the functional characteristics of the lure and the optimum combination may be found for the intended use with each type of fish.

It should also be noted that while stainless steel has been described for the materials of the shaft 20 and tube 28, other metals may be used with equal ease and dispatch, such as titanium, INCONEL, etc.

Further, the shaft 20 is configured with an arched open loop 30 formed integrally with the hollow tube 28 at the apex of the V-shape, as shown in FIG. 1. It is important that this loop 30 is formed in conjunction with the tube 28, as the purpose of the loop is to provide an attachment for the fishing line and the extra stiffness given at this interface by the tube 28 is beneficial to the lures integrity.

Figure 7:
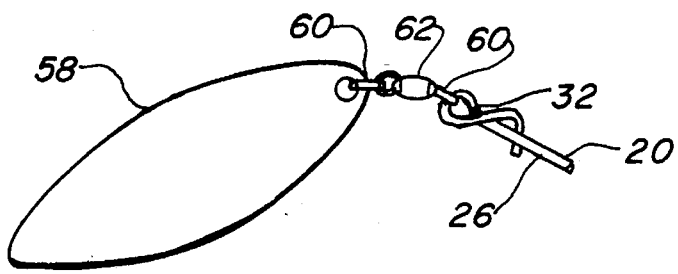
FIG. 7 is a fragmentary elevation view of the contiguous loop in the twisted embodiment.

The second arm 26 contains a contiguous loop 32 at the distal end for attachment purposes. The loop 32 may be formed by bending the distal end of the arm 26 into an eye and twisting around the parent shaft arm in a manner well known in the art, as illustrated in FIG. 7. While this method is perfectly acceptable, the contiguous loop 32 may be formed as a quick release closure 34, as depicted in FIGS. 3 through 6. This novel feature is accomplished by bending the distal end of the second arm 26 into an eye, as above, except instead of wrapping or twisting the end, it is bent parallel with the shaft arm and a sleeve 36 slideably embraces and slips over both the arm 26 and the parallel end of the loop 32. The sleeve 36 may be slid back away from the closure 34 exposing the loop distal end permitting separation by springing the loop 32 open for attaching purposes and reassembly by sliding the sleeve 36 back into position. The sleeve may be in cylindrical shape as a tightly wound tension spring 38, depicted in FIG. 5, or a hollow cylinder 40 illustrated by itself in FIG. 6. In either case, the preferred material is stainless steel in any or all of its varieties.

Figure 8:
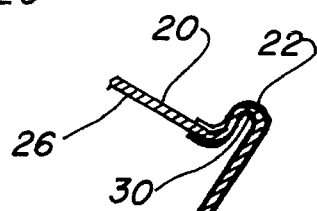
FIG. 8 is a cross-sectional view taken along lines 8—8 of FIG. 2 illustrating the junction of the first arm and the fish hook with the skirt omitted

A conventional fishing hook 42 is angularly crimped onto the outermost end of the first arm 24 and tube 28, as depicted in the cross-section of FIG. 8 with its obvious purpose of retaining a fish when caught. The angle of the hook 42, with respect to the arm 24, is preferably from 40 degrees to 50 degrees, with 45 degrees optimum. The hook size may vary, usually from 1/0 to 10/0, depending on the application. A weighted head 44 surrounds the hook 42 at the crimp interface providing mass and visual recognition for the quested fish. The head 44, shown best in FIG. 8, consists of a head portion 46, neck 48, collar 50, and trailer keeper 52, and is constructed of a relatively heavy material, such as metal. Brass or stainless steel may be used, however, a lead alloy is preferred with a combination of lead, tin and antimony, such as 1 to 3 percent tin, 5 to 6 percent antimony, and the balance pure lead. The weighted head may be painted with 7 or 8 coats of polyurethane paint in bright colors to attract the fish and an eye 54 may also be painted with a different color to represent a minnow or some kind of bait fish. Any color or type of paint may be used, and the weighted head may be in almost any configuration, as long as it represents an attractive bait for the type of fish to be caught.

A banded filament skirt 56 is attached around the neck 48 of the weighted head 44 with nylon/cotton blend thread, as commonly used in tying lures, such as flies, and the like. The skirt 56 is, also well known in the art, constructed of split plastic or rubber with a skip on both ends for ease of handling and assembly. The skirt 56 may be one color or a combination thereof and may have different types of materials and hews distending in both directions from the thread binding. From 32 to 120 strands of the skirt are preferred in most lures. The length of the skirt may also vary as to the size of the hook 42 and the type of fish to be caught.

Figure 9:
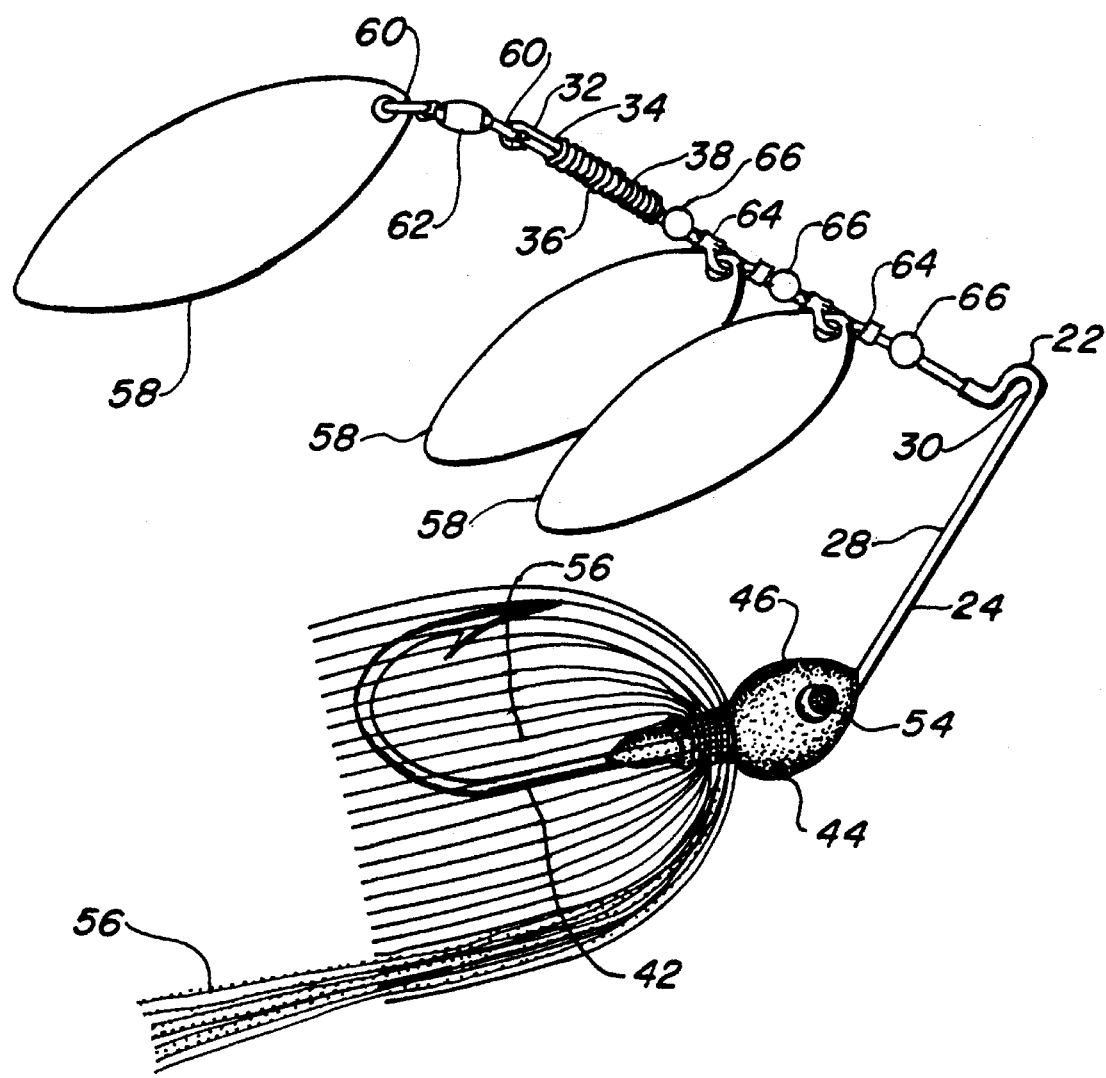
FIG. 9 is a fragmentary elevation view of a pair of spinners attached with yokes to the second arm.

At least one spinner 58 is rotatably attached to the second arm 26 through the contiguous loop 32 by the use of rings 60 and swivels 62, again well known in the art. A second spinner 58 may be attached with a yoke 64 to the same second arm 26 between the contiguous loop 32 and the arched open loop 30 using hollow or solid beads 66 as spacers, as shown in FIG. 1. A pair of spinners 58 mounted in the same manner may be substituted for the single second spinner, described above, with equal ease and the number and location of beads 66 may vary, as desired. The pair of spinners 58 are not illustrated in FIG. 9 and appear as a simple duplicate of that depicted in FIG. 1.

Any spinner 58 may be used with equal ease, as much development has been accomplished in that specific field of endeavor. The spinners differ in shape of the blade, amount of cup and texture or color. Some types that are presently available include the so-called willow leaf, as illustrated in FIGS. 1, 2, 3, 4 and 7, the Colorado, both in deep cup and regular configuration, the French, Indiana, and a number of buzz blades, also well known in the art. These spinners are usually metallic and may be plated with nickel, chrome, gold, copper, etc., or simply painted almost any bright color. The purpose of the spinner is obviously to attract fish, therefore, the combination of color, texture, shape, and configuration may vary as to the type of fish to be attracted and the movement characteristics, along with the depth variations created by each design.

While artificial lures have much in common and utilize many of the same elements, it has been found that this invention has developed new and unusual movement in the water, which throbs and wiggles freely unlike those previously known, creating vibrations that greatly enhance its fish catching capability.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A spinner artificial fishing lure comprising;

a wire shaft angularly bent into a substantially V-shape at an apex forming a first arm and a second arm, said first arm having a hollow stainless steel surgical tube intimately surrounding the shaft compounding stiffness of the first arm, said shaft having an arched open loop formed integrally with the hollow tube at the V-shape apex for attaching a fishing line thereunto, said second arm having a contiguous loop formed at a distal end for attachment purposes, a hook angularly crimped onto the first arm and tube at an outermost end for retaining a fish, a weighted head surrounding the hook and first arm crimp creating visual bait for fish, a filament skirt attached around the head for attracting fish, and at least one spinner rotatably attached to the second arm including the contiguous loop, freely oscillating and vibrating, eliminating any counter effects of movement and harmonics of the first arm, thus permitting the second arm to throb, flutter, and wiggle the lure in a captivating manner.

2. The fishing lure as recited in claim 1 wherein said wire shaft further comprises a diameter of from 0.026 inches (0.066 cm) to 0.051 inches (0.13 cm).

3. The fishing lure as recited in claim 1 wherein said wire shaft and hollow tube have an inbetween clearance of from 0.001 inches (0.0025 cm) to 0.004 inches (0.010 cm).

4. The fishing lure as recited in claim 1 further comprising epoxy resin adhesive disposed between the first arm wire shaft and the hollow tube to magnify stiffness and prevent torsional rotation between the shaft and the first arm.

5. The fishing lure as recited in claim 1 wherein said second arm contiguous loop further comprises a quick release closure having a sleeve slidingly embracing both the wire shaft second arm and the contiguous loop distal end, such that the sleeve may be slid along the second arm exposing the loop distal end permitting springable separation for attaching and removing spinners without permanent distortion of the second arm contiguous loop and second arm.

6. The fishing lure as recited in claim 5 wherein said quick release closure sleeve further comprises a tightly wound tension spring.

7. The fishing lure as recited in claim 5 wherein said quick release closure sleeve further comprises a hollow cylinder.

8. The fishing lure as recited in claim 1 wherein said at least one spinner further comprises a spinner attached to the contiguous loop and a spinner attached with a yoke to the second arm between the contiguous loop and the shaft arched open loop.

9. The fishing lure as recited in claim 1 wherein said at least one spinner further comprises a spinner attached to the contiguous loop and a pair of spinners attached with yokes to the second arm between the contiguous loop and the shaft arched open loop.

10. A spinner artificial fishing lure comprising;

a wire shaft angularly bent into a substantially V-shape at an apex forming a first arm and a second arm, said first arm having a hollow tube intimately surrounding the shaft compounding stiffness of the first arm, said shaft having an arched open loop formed integrally with the hollow tube at the V-shape apex for attaching a fishing line thereunto, said second arm having a contiguous loop with a quick release closure formed at a distal end for attachment purposes, a hook angularly crimped onto the first arm and tube at an outermost end for retaining a fish, a weighted head surrounding the hook and first arm crimp creating visual bait for fish, a filament skirt attached around the head for attracting fish, and at least one spinner rotatably attached to the second arm including the second arm contiguous loop, freely oscillating and vibrating, eliminating any counter effects of movement and harmonics of the first arm, thus permitting the second arm to throb, flutter, and wiggle the lure in a captivating manner.

11. The fishing lure as recited in claim 10 wherein said wire shaft further comprises a diameter of from 0.026 inches (0.066 cm) to 0.051 inches (0.13 cm).

12. The fishing lure as recited in claim 10 wherein said wire shaft and hollow tube have an inbetween clearance of from 0.001 inches (0.0025 cm) to 0.004 inches (0.010 cm).

13. The fishing lure as recited in claim 10 further comprising epoxy resin adhesive disposed between the first arm wire shaft and the hollow tube to magnify stiffness and prevent torsional rotation between the shaft and the first arm.

14. The fishing lure as recited in claim 10 wherein said loop with quick release closure further comprises a tightly wound tension spring sleeve slideably embracing both the wire shaft second arm and the loop distal end, such that the sleeve may be slid away along the second arm, exposing the loop distal end, permitting springable separation for attaching and removing spinners without permanent distortion of the loop distal end and second arm.

15. The fishing lure as recited in claim 10 wherein said loop with quick release closure further comprises a hollow cylinder sleeve slideably embracing both the wire shaft second arm and the loop distal end, such that the sleeve may be slid away along the second arm, exposing the loop distal end, permitting springable separation for attaching and removing spinners without permanent distortion of the loop distal end and second arm.

16. The fishing lure as recited in claim 10 wherein said at least one spinner further comprises a spinner attached to the second arm contiguous loop and a spinner attached with a yoke to the second arm between the second arm contiguous loop and the shaft arched open loop.

17. The fishing lure as recited in claim 10 wherein said at least one spinner further comprises a spinner attached to the second arm contiguous loop and a pair of spinners attached with yokes to the second arm between the second arm contiguous loop and the shaft arched open loop.

* * * * *